United States Patent [19]
Satran et al.

[11] Patent Number: 5,486,073
[45] Date of Patent: Jan. 23, 1996

[54] CUTTING INSERT FOR A MILLING CUTTER TOOL

[75] Inventors: Amir Satran, Kfar Havradim; Rafael Margulis, Karmiel, both of Israel

[73] Assignee: ISCAR Ltd., Migdal, Israel

[21] Appl. No.: 90,839

[22] Filed: Jul. 12, 1993

[30] Foreign Application Priority Data

Sep. 1, 1992 [IL] Israel ......................... 103008

[51] Int. Cl.$^6$ ........................................ B23C 5/02
[52] U.S. Cl. ................................ 407/113; 407/42
[58] Field of Search .................... 407/42, 113, 114, 407/115, 116

[56] References Cited

U.S. PATENT DOCUMENTS

| | | | |
|---|---|---|---|
| 4,940,369 | 7/1990 | Aebi et al. | 407/42 |
| 5,052,863 | 10/1991 | Satran | 407/116 |
| 5,071,292 | 12/1991 | Satran | 407/116 |
| 5,145,295 | 9/1992 | Satran | 407/116 |
| 5,193,946 | 3/1993 | Arai et al. | 407/113 |

FOREIGN PATENT DOCUMENTS

| | | |
|---|---|---|
| 2164283 | 3/1986 | United Kingdom . |
| 2190863 | 12/1987 | United Kingdom . |

*Primary Examiner*—Bruce M. Kisliuk
*Assistant Examiner*—Eileen P. Morgan
*Attorney, Agent, or Firm*—Pennie & Edmonds

[57] ABSTRACT

A cutting insert for a rotary routing cutter tool, the insert being of substantially parallelepipedal shape and having a first pair of elongated cutting edges substantially parallel to a rotary axis of the insert, each cutting edge of the first pair being defined between contiguous rake and relief surfaces of the insert; a second pair of cutting edges transversely directed with respect to the first pair, each cutting edge of the second pair comprising first and second successive cutting portions, the first cutting edge portion merging with an adjacent cutting edge of the first pair via a rounded insert corner, the adjacent cutting edges defining at the corner a substantially acute angle; the second cutting edge portion sloping towards a base of the insert so as substantially to intersect the rotary axis and so as to merge with an adjacent cutting edge of the first pair via a coupling portion which slopes away from the insert base.

9 Claims, 5 Drawing Sheets

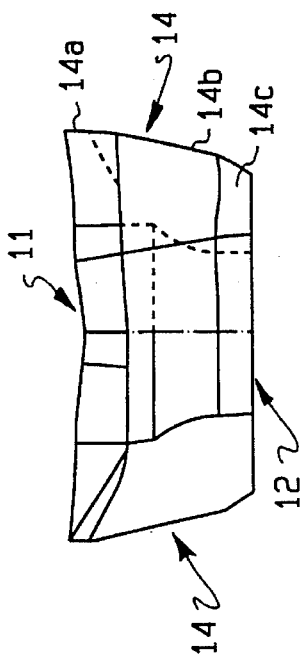
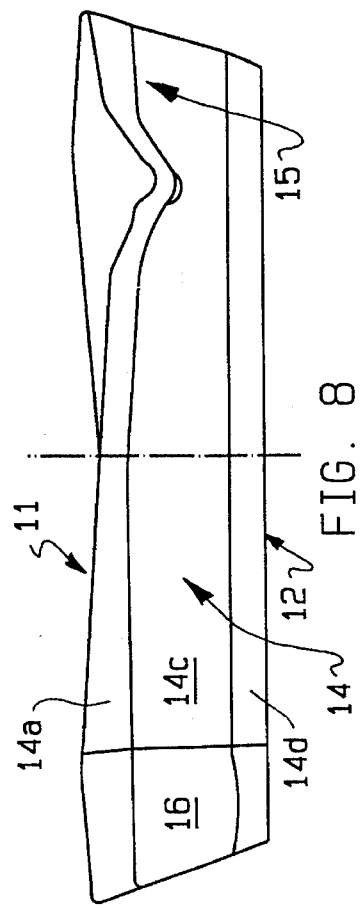
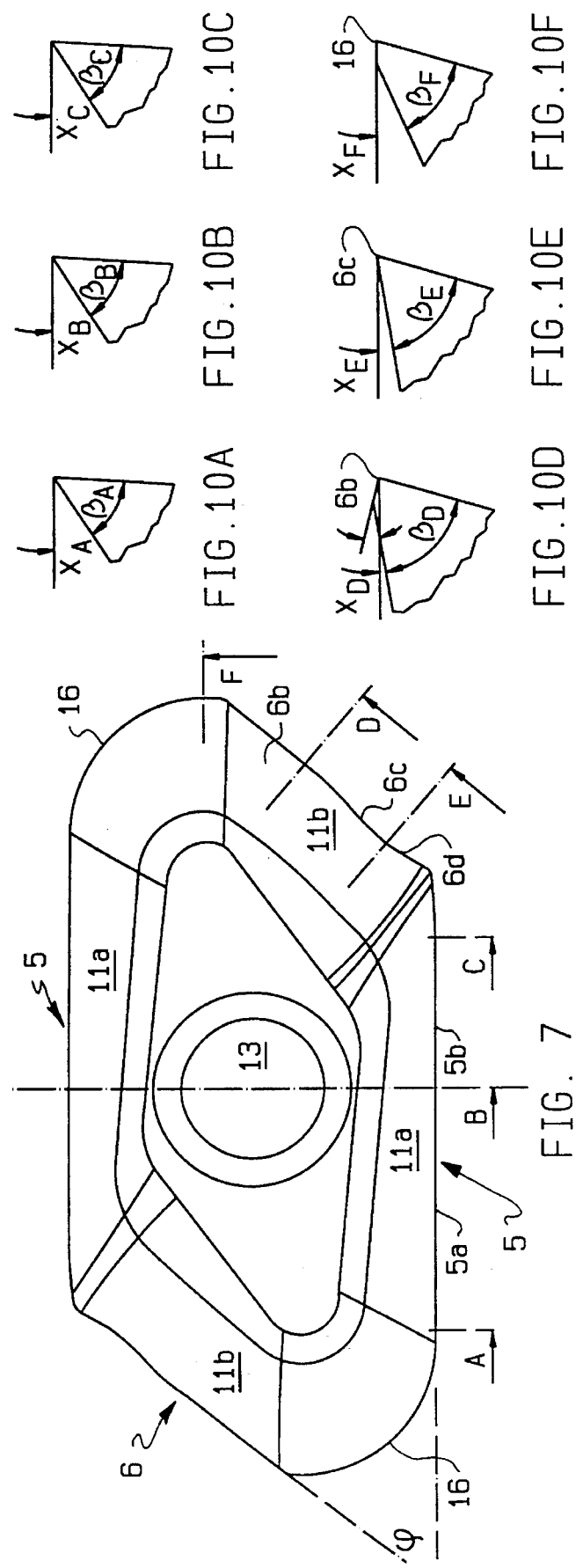
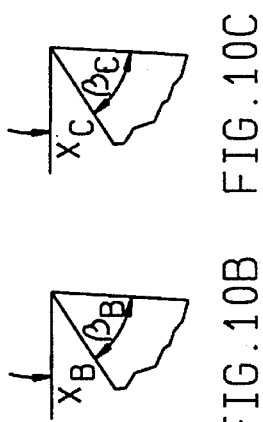
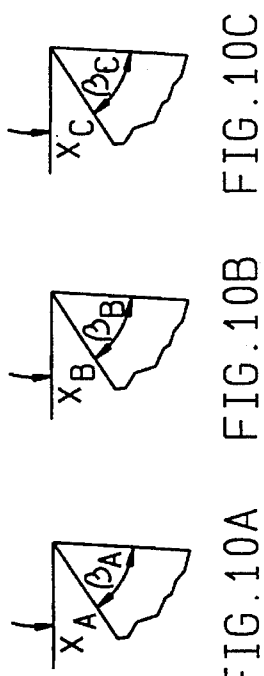
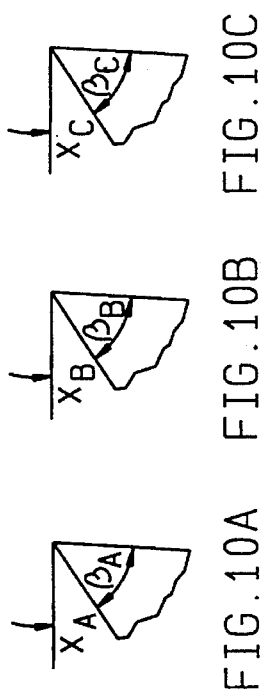
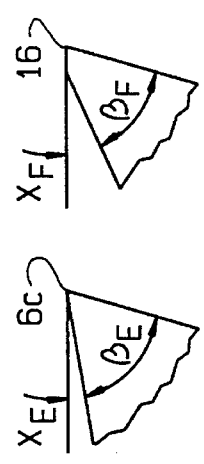
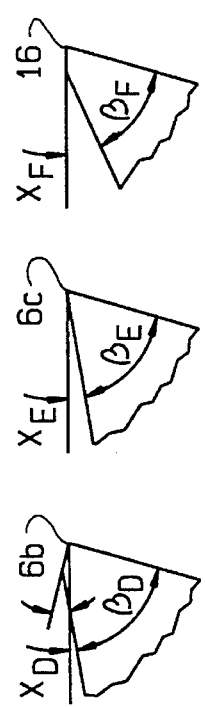
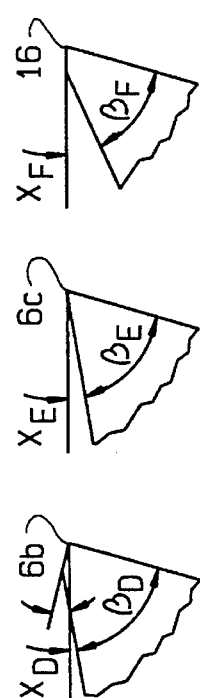

CUTTING INSERT FOR A MILLING CUTTER TOOL

FIELD OF THE INVENTION

This invention relates to a cutting insert for a milling cutter tool, in particular a rotary routing cutter tool.

BACKGROUND OF THE INVENTION

Routing cutter tools are employed in the machining of workpieces where it is required to remove from the workpiece substantial amounts of metal leaving precisely determined slots or recesses in the machined workpiece. A particular example of such routing operations is in the machining of aircraft structural components such as, for example, wing structures, wherein it is required to reduce to a maximum degree the weight of the structure whilst ensuring its mechanical strength. For this purpose the workpiece, usually formed of aluminum, is subjected to slotting and recessing, adjacent recesses in the workpiece being very often separated by extremely thin-walled portions. It will therefore be appreciated that the routing operation involves the removal of considerable quantities of metal and production efficiency requires a relatively high rate of such metal removal. At the same time, and in view of the fact that there remain in the machined component very thin separating walls, it is vital to ensure that the routing operation does not damage these thin-walled portions or induce undesirable stresses and strain therein.

Of its very nature, a routing operation involves an initial boring or drilling penetration of the workpiece by the cutting insert in the direction of the rotary axis of the cutting tool, and a subsequent milling operation involving a relative transverse displacement of the workpiece with respect to the rotary axis of the cutter tool. It has been proposed in this connection (GB 2 164 283) to provide a rotary routing cutter tool having a cutting insert wherein the rotary axis of the cutter tool is offset with respect to the cutting insert. Under these circumstances, and as is clearly explained and illustrated in this prior patent specification, the maximum depth to which the cutting insert can penetrate the workpiece in any single operation is limited. This limitation arises out of the fact that the insert does not have any cutting edge adjacent the rotary axis and there is therefore generated an upstanding core which limits the continued penetration of the cutting insert into the workpiece. In order to overcome this problem penetration and slotting takes place in a series of successive operations, in each of which the insert penetrates the workpiece by its predetermined maximum amount, then proceeds to reciprocate transversely from one end of the slot to the other, so as to remove the upstanding core. The routing operation therefore proceeds by way a series of successive ramps. It is therefore quite clear that this procedure, of necessity, reduces the rate of removal of the metal.

It is an object of the present invention to provide a new and improved cutting insert for a rotary routing cutter tool which facilitates an improved efficient rate of metal removal from a workpiece whilst minimizing the introduction of stresses into the workpiece during such removal.

BRIEF SUMMARY OF THE INVENTION

According to the present invention, there is provided a cutting insert for a rotary routing cutter tool, the insert being of substantially parallelepipedal shape and having a first pair of elongated cutting edges substantially parallel to a rotary axis of the insert, each cutting edge of said first pair being defined between contiguous rake and relief surfaces of said insert; a second pair of cutting edges transversely directed with respect to said first pair, each cutting edge of said second pair comprising first and second successive cutting edge portions, said first cutting edge portion merging with an adjacent cutting edge of said first pair via a rounded insert corner, the adjacent cutting edges defining at said corner a substantially acute angle; said second cutting edge portion sloping towards a base of said insert so as substantially to intersect said rotary axis and so as to merge with an adjacent cutting edge of said first pair via a coupling portion which slopes away from said insert base.

With such a cutting insert in accordance with the invention, the fact that the cutting edge of the second pair of cutting edges intersects the rotary axis of the insert ensures that the penetration of the insert into the workpiece during its boring or drilling operation is not limited, as is the case in the prior art referred to above, by the generation of an upstanding core. Thus, in the present case the drilling operation is accompanied by an effective, simultaneous milling operation carried out by the second cutting edge portion, and in this way the metal is continuously removed until the insert reaches its predetermined depth of operation. Once this has occurred, transverse displacement of the workpiece with respect to the cutter tool ensures the removal of the metal in the slot or recess which is to be formed by the elongated cutting edge of the first pair of cutting edges. Thus, the effective slotting or recessing of the workpiece is carried out in an essentially two-stage operation-in which, in the first stage, the insert penetrates the workpiece to its required predetermined depth and, in the second stage, the transverse movement of the workpiece with respect to the insert ensures the effective milling of the recess.

Thus, when there is employed, in accordance with the invention, an insert having a relatively elongated cutting edge, a relatively deep recess can be machined with a minimum series of operations, thereby substantially enhancing the rate of metal removal.

Preferably, the first cutting edge portion slopes towards the insert base and defines, with the second cutting portion, a substantially obtuse angle. In this way there is ensured an optimal distribution of the radially directed forces acting on the insert during the penetration or drilling stage.

In accordance with a preferred embodiment of the present invention, each cutting edge of the first pair of cutting edges comprises first and second successive cutting edge sections, a first cutting edge section adjacent a rounded insert corner being associated with rake and relief surfaces which are continuously curved so that the rake and relief angles as defined with respect to a tool holder remain substantially invariant along the length of the first cutting section whilst the second cutting edge section is associated with a rake surface which defines a substantially constant angle with respect to the insert base, with the rake surface angle as defined with respect to the tool holder increasing along the length of the second cutting edge section.

Thus, the geometry of the insert along the length of the first cutting edge section is substantially as described in our prior U.S. Pat. No. 5,071,292 and this construction is particularly effective in ensuring that the milling operation is carried out in such a manner that it is accompanied by minimal stresses being imparted to the workpiece, and especially to the thin dividing walls remaining in the workpiece after the removal of the metal. On the other hand, the provision of the milling cutting edge with the second cutting edge section having a differing geometry from the first cutting edge section introduces a geometrical discontinuity and, as a consequence, there is a reduction in the vibrations imparted into the cutting tool which would normally ensue as a result of the use of such an elongated milling cutting edge and this, of course, facilitates the use of such an elongated cutting edge.

BRIEF SUMMARY OF THE DRAWINGS

There will now be described by way of example one embodiment of a cutting insert in accordance with the present invention for a rotary routing cutter tool, and this with reference to the accompanying drawings in which:

FIG. 7 is a plan view of the cutting insert in accordance with the invention;

FIG. 8 is a side elevation of the insert shown in FIG. 7;

FIG. 9 is an end elevation of the insert shown in FIG. 7, partially sectioned along the line B;

FIGS. 10a, 10b, 10c, 10d, 10e and 10f are respectively cross-sectional views of the cutting edge portions of the insert shown in FIG. 7 taken along the lines A–F.

DETAILED DESCRIPTION OF PREFERRED EMBODIMENT

Figure 1:
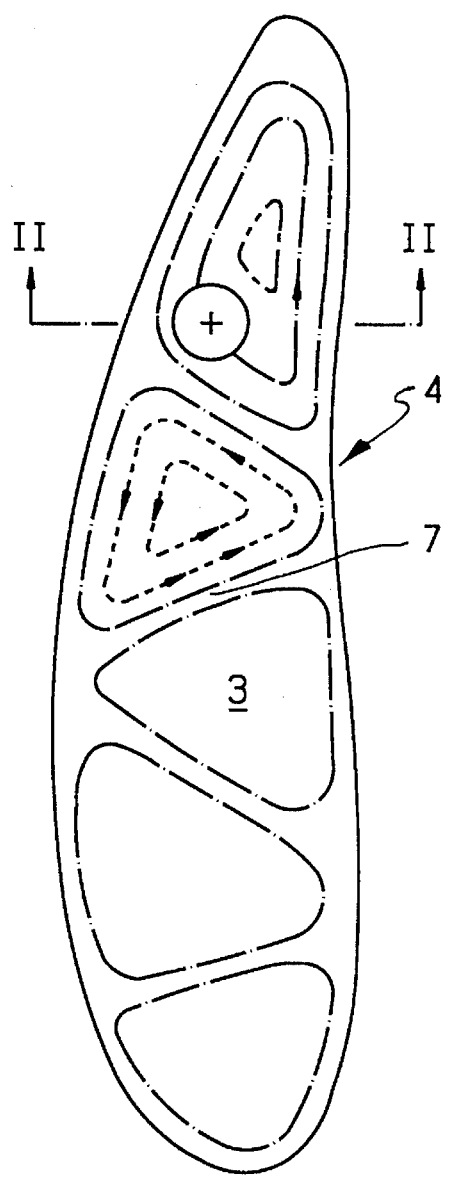
FIG. 1 is a side elevation of an aircraft wing component to be machined with a routing cutter tool having a cutting insert in accordance with the invention.
Figure 2:
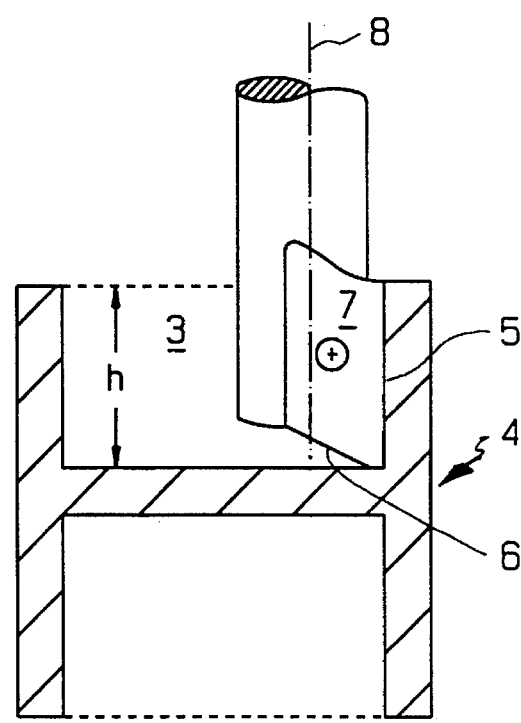
FIG. 2 is a cross-sectional view of the wing component shown in FIG. 1, taken along the line II:II, with the routing cutter tool in position.
Figure 3:
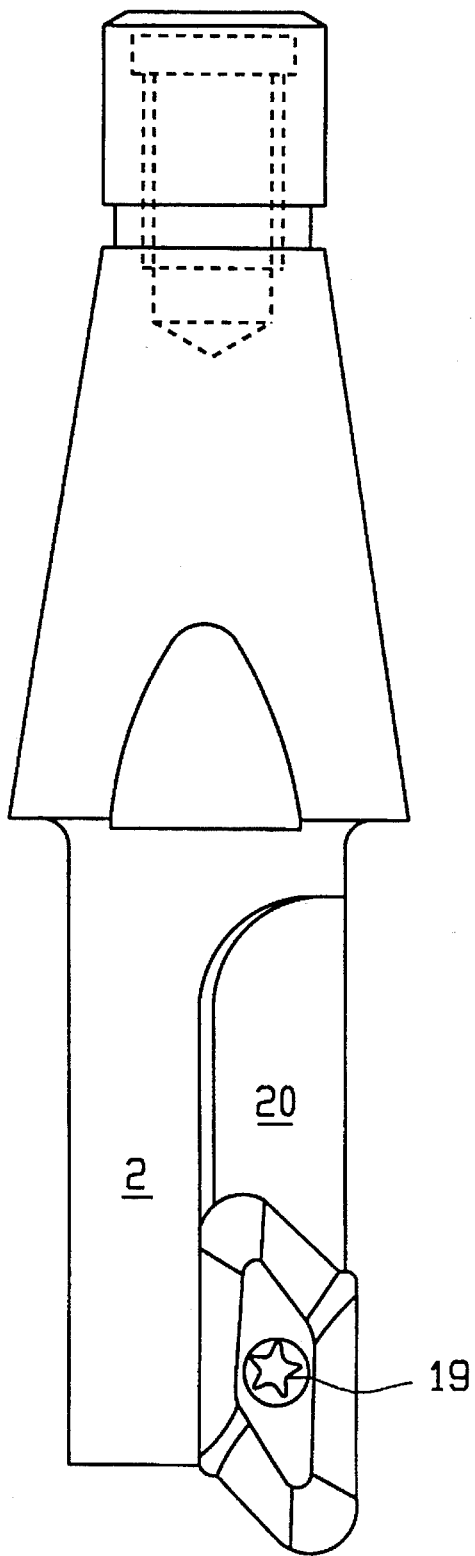
FIG. 3 is a side elevation of the routing cutter tool incorporating the cutting insert in accordance with the present invention.
Figure 6:
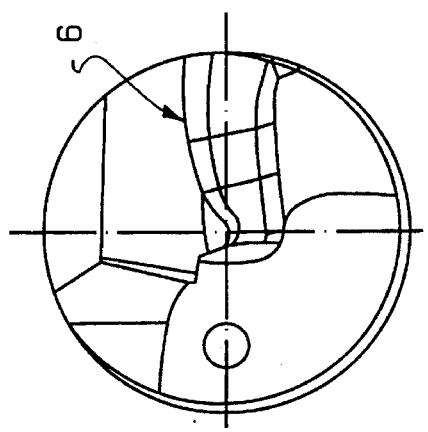
FIG. 6 is an end-on plan view of the tool shown in FIGS. 3, 4 and 5.
Figure 4:
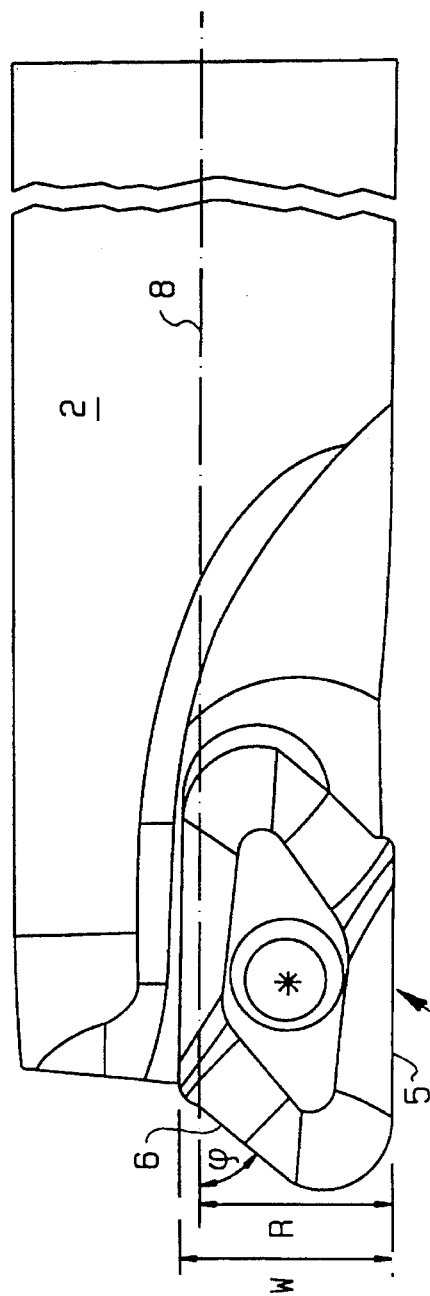
FIG. 4 is a view on an enlarged scale of a portion of the cutting tool shown in FIG. 3.

As seen in FIGS. 1 and 2 of the drawings, a cutting insert 1 is mounted on a shaft 2 of a rotary routing cutter tool (seen in greater detail in FIGS. 4, 5 and 6 of the drawings) and is employed for the machining of predeterminedly contoured slots or recesses 3 formed, for example, in an aircraft structural component 4. For this purpose, the insert 1 is designed to penetrate by a drilling or boring operation into the component 4, the height of penetration h corresponding to the length of a major cutting edge 5 of the insert 1, the actual boring or drilling being effected by a transversely directed cutting edge 6. Once the insert has fully penetrated the component 4, a laterally directed movement of the component with respect to the insert gives rise to a milling operation, the relative movement of the insert with respect to the component being indicated by the chain dotted lines. With the completion of this milling operation, there is left a recess 3, adjacent recesses being separated from each other by thin separating walls 7.

As can be clearly seen in FIG. 2 of the drawings, the laterally directed cutting edge 6 intersects a rotary axis 8 of the tool and, as a consequence, the continued drilling penetration of the insert into the component is accompanied by an effective simultaneous milling operation carried out by the second cutting edge 6 and in this way the metal is continuously removed until the insert reaches its predetermined depth of operation.

Reference will now be made to FIGS. 3 through 11 of the drawings for a detailed description of the cutting insert in accordance with the invention, its mode of mounting in a routing cutter tool and the mode of use thereof in a routing operation.

As seen in the drawings, the cutting insert 1 is of parallelepipedal shape and is formed with a pair of major milling cutting edges 5 and a pair of transversely directed cutting edges 6. The insert 1 is furthermore formed with an upper surface 11 and a lower base surface 12 and with a centrally disposed clamping bore 13.

Each major elongated cutting edge 5 is defined between an adjacent rake surface 11a and a major relief flank 14. Each laterally directed cutting edge 6 is defined between an adjacent rake surface 11b and a laterally directed relief flank 15. Adjacent major and lateral cutting edges 5 and 6 and their associated adjacent relief flanks 14 and 15 merge via a pair of diagonally opposed rounded insert corners 16.

As can be seen in FIG. 7 of the drawings, the major and lateral cutting edges 5 and 6 define, in the region of their rounded corner 16 an acute angle $\phi$.

Figure 5:
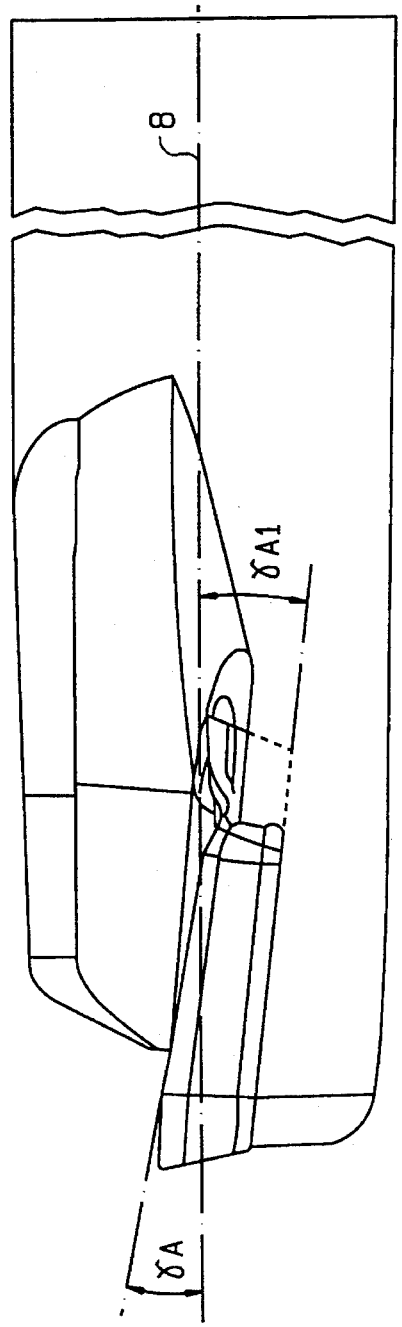
FIG. 5 is a view on an enlarged scale of the portion of the tool shown in FIG. 4 when rotated by 90° with respect to the longitudinal axis of the tool.

The insert 1 is clamped via a screw clamp 19 onto a seating 20 of an axially directed recess formed in the shaft 2 of the routing tool. As can be seen in FIG. 5 of the drawings, the seating 20 is directed at an angle $\gamma_{A1}$ with respect to the axial plane of the tool in which lies the rotary axis 8. On the other hand, the major cutting edge 5 slopes towards the base surface 12 of the insert and defines, with the longitudinal axial plane of the tool in which the rotary axis 8 lies, an angle $\gamma_A$, this being the axial rake angle of the insert. In order to achieve a major milling cutting edge 5 which can provide maximum penetration of the workpiece, the insert is relatively elongated and therefore structural requirements dictate that the insert be of significant depth. So as to ensure that the supporting region of the tool shaft is sufficiently strong to support the insert during its drilling and milling operations, the insert must be mounted on the tool with a significant portion thereof mounted above the central plane of the tool (see FIGS. 5 and 6). However, and in order to ensure that, during the drilling operation, the drilling is effective in removing the entire drilled portion without leaving any upstanding core, it is necessary to ensure that the drilling cutting edge intersects the rotary axis 8 of the tool. It is for this reason and also to ensure a balancing of the radially directed forces acting on the insert that a particular cutting edge geometry is adopted for the laterally directed cutting edge, and this geometry will now be described.

Figure 11:
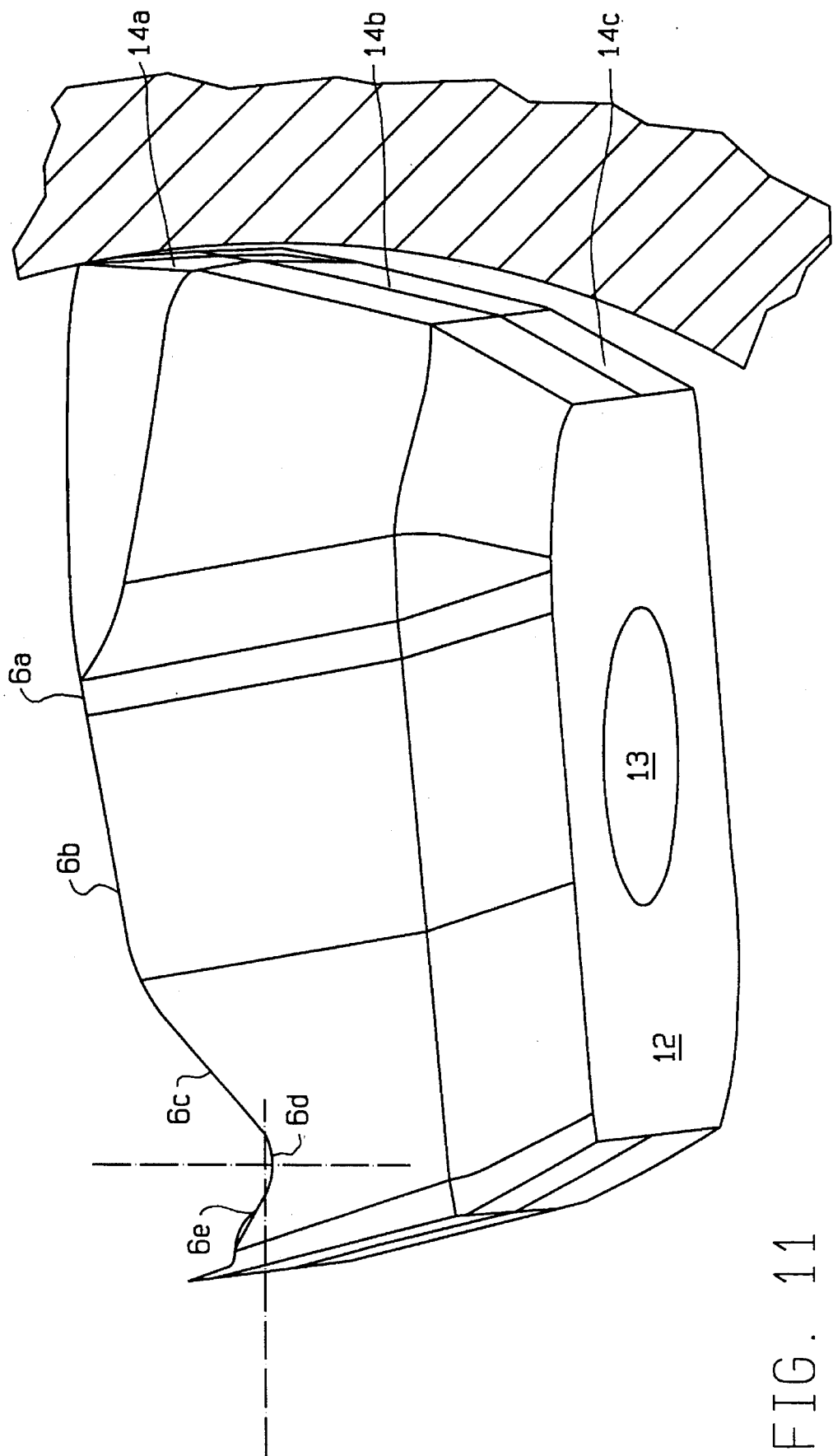
FIG. 11 is a perspective view of the cutting insert in accordance with the invention as mounted in the cutter tool (with the cutter tool removed) illustrating it with respect to the workpiece.

As can be clearly seen in FIG. 11 of the drawings, the laterally directed cutting edge 6 merges with the rounded corner 16 via an initial cutting edge portion 6a (of minimal length) which is substantially parallel to the base surface 12 of the insert. The portion 6a is followed by a subsequent cutting edge portion 6b, which slopes downwardly to the base portion 12 and is followed by a cutting edge portion 6c, which defines a substantially obtuse angle with the preceding portion 6b and slopes more steeply to the base portion 12. The cutting edge portion 6c merges with the lowermost portion 6d of the cutting edge, which substantially intersects the rotary axis 8 of the cutting insert and is followed by a coupling portion 6e which slopes away from the base portion 12 so as to merge with the adjacent major cutting edge 5.

As can be seen in FIGS. 7, 10d, 10e and 10f of the drawings, the cutting edge associated with the nose 16 is formed with a reinforcing land and has a wedge angle $\beta_F$. The cutting edge 6b is also provided with a reinforcing land and is associated with a wedge angle $\beta'_D$. Finally, the cutting edge portion 6c is associated with a wedge angle $\beta_E$ and is not provided with a reinforcing land. $\beta_F$ is preferably less than $\beta_D$ and $\beta_D$ is preferably less than $\beta_E$ and, as can be seen, whilst the cutting edges 6d and 6c are positive, the cutting edge 6b is negative.

This particular geometry for the differing portions of the laterally directed cutting edge 6 is chosen in view of the fact that during the drilling operation the greatest stresses on the cutting edge are effected in the nose portion 16 and the cutting edge portion 6b, whilst minimum stresses are exerted in the region 6d of the cutting edge 6 where it intersects with the rotary axis. It is for this reason that regions of the cutting edge where the maximum stresses are to be expected are reinforced with land structures and are even rendered negative.

Furthermore, the actual drilling penetration is mainly carried out with the cutting edge portions presented by the nose 16 and the edge portions 6b and 6c. At the same time, the cutting edge portion 6c performs a milling operation, continually removing the conically shaped core which is formed during the drilling operation.

Reference will now be made to FIGS. 7, 10a, 10b and 10c of the drawings for a description of the geometry of the major cutting edge 5. This cutting edge is divided into two successive sections, 5a and 5b, the section 5a extending from the nose portion 16 to substantially the central region of the insert, whilst the section 5b extending from substantially the central portion of the insert to the region where it merges with the coupling portion 6e of the transversely directed cutting edge 6. The initial section 5a is so formed as to have curved relief flank and rake surfaces such that the rake surface angle and the relief angle of this section, when measured with respect to the tool, remains substantially constant along its length. The magnitudes of these angles are chosen bearing in mind the relatively difficult milling conditions when the insert has to perform its initial milling in the workpiece. In the subsequent cutting edge section 5b the rake surface defines a substantially constant angle with respect to a reference plane parallel to the base 12 of the insert (thus this angle Xb in FIG. 10b is substantially equal to Xc in FIG. 10c). On the other hand, the rake surface angle of the insert in the cutting edge section 5b, as measured with respect to the tool, increases along the length of the cutting edge section 5b and, in view of the fact that the relief angle, when measured with respect to the tool, remains constant, the wedge angle $\beta$ of the insert is steadily reduced along the length of the section 5b.

The provision of the initial cutting edge section 6a with the particular geometry described above (invariant rake surface and relief angles as measured with respect to the tool) is dictated by the fact that in the initial milling stages (involving this section 6a) the forces acting on the insert are at their maximum. Subsequently, when the cutting edge section 6b becomes involved the forces are relatively reduced, facilitating the particular cutting edge geometry for this section described above.

By virtue of the division of the major cutting edge 5 into two separate sections 5a and 5b of differing geometries, and the provision of a geometrical discontinuity in the cutting edge 5, vibrations of the insert and consequently of the cutting tool, which would otherwise be very significant with such an elongated cutting edge and especially with a cutting tool of a relatively limited diameter, are substantially reduced.

Whilst in the specific example described above the division of the elongated major cutting edge 5 into two portions of differing geometries takes place substantially at the center of the cutting edge, it will be realized that the division can take place at differing locations of the cutting edge. One factor determining the point where division takes place is the degree of axial positivity of the cutting edge 6. Thus, with increasing axial positivity the location where cutting edge section 6a merges into cutting edge section 6b is displaced away from the insert nose 16. Another factor is the material which is being milled. Thus, the harder the material, the greater is the need for the major portion of the cutting edge to be provided with the substantially invariant relief and rake surface angles (as measured with respect to the tool), but with relatively easily worked materials, such as aluminum, this need becomes less pronounced and the division can readily be effected at the midportion of the cutting edge.

Preferably, all locations along the cutting edge 6 (i.e. in both sections 6a and 6b thereof) lie on the cylindrical surface constituting the envelope generated by the rotating insert. In this way it is ensured that a smooth continuous surface is milled.

As can be seen in FIGS. 9 and 11 of the drawings, the relief flank 14 is divided into three successive portions 14a, 14b and 14c. The portion 14a, at least along the length of the relief flank associated with the first cutting edge section 5a, is continuously curved. The relief flank portion 14b is substantially planar and serves for the effective sideways clamping of the insert in the tool holder. The lowermost relief flank portion 14c slopes inwardly with respect to the adjacent portion 14b (i.e., defines with respect to a normal to the base 12 an angle which is greater than the angle defined by the relief flank portion 14b with respect to the normal). It can be readily seen from FIG. 11 of the drawings that the provision of this third relief flank portion 14c ensures that the regions of the insert adjacent the base 12 thereof do not foul the walls of the drilled hole during the drilling operation, this being particularly important when a tool of relatively narrow diameter is employed.

In one characteristic example of a cutting insert for use with a rotary routing tool in accordance with the invention, the following characteristic dimensions were employed:

Major diagonal dimension of upper surface =31 mm

Minor diagonal dimension of upper surface =19 mm

Length of major cutting edge =22 mm

Maximum depth of insert =6.5 mm

Maximum width of insert =14.5 mm

We claim:

1. A cutting insert for a rotary routing cutter tool, said insert being of substantially parallelopipedal shape and having a first pair of elongated cutting edges substantially parallel to a rotary axis of the insert, each cutting edge of said first pair being defined between contiguous rake and relief surfaces of said insert; a second pair of cutting edges transversely directed with respect to said first pair, each cutting edge of said second pair comprising first and second successive cutting edge portions, said first cutting edge portion merging with an adjacent cutting edge of said first pair via a rounded insert corner, the adjacent cutting edges defining at said corner a substantially acute angle; said second cutting edge portion sloping towards a base of said insert so as substantially to intersect said rotary axis and so as to merge with an adjacent cutting edge of said first pair via a coupling portion which slopes away from said insert base wherein said first cutting edge portion slopes toward said insert base.

2. A cutting insert according to claim 1, wherein said first and second cutting edge portions define between them a substantially obtuse angle.

3. A cutting insert according to claim 1, wherein said first cutting edge portion merges with said insert corner via an initial portion substantially parallel to said insert base.

4. A cutting insert according to claim 1, wherein said first cutting edge portion is formed with a reinforcing land portion and is associated for at least part of its length with a negative rake surface.

5. A cutting insert according to claim 1, wherein each cutting edge of said first pair comprises first and second successive cutting edge sections wherein a first cutting edge section adjacent to a rounded insert corner is associated with rake and relief surfaces which are continuously curved so that the rake and relief angles as defined with respect to a tool holder remain substantially invariant along the length of said first cutting edge section, whilst the second cutting edge section is associated with a rake surface which defines a substantially constant angle with respect to said insert base and wherein the rake surface angle as defined with respect to said tool holder increases along the length of said second cutting edge section.

6. A cutting insert according to claim 5, wherein each cutting edge of said first pair slopes towards said insert base from the rounded insert corner.

7. A cutting insert according to claim 5, wherein each cutting edge of said first pair is associated with a relief flank surface which comprises a first portion adjacent said cutting edge and a second substantially planar portion adjacent said base.

8. A cutting insert according to claim 7, wherein said second substantially planar portion merges with said base via a further relief flank portion which defines with respect to a normal to said base an angle which is greater than the angle defined by said second relief flank portion with respect to said normal.

9. A cutting insert for a rotary routing cutter tool, said insert being of substantially parallelopipedal shape and having a first pair of elongated cutting edges substantially parallel to a rotary axis of the insert, each cutting edge of said first pair being defined between contiguous rake and relief surfaces of said insert; a second pair of cutting edges transversely directed with respect to said first pair, each cutting edge of said second pair comprising first and second successive cutting edge portions, said first cutting edge portion merging with an adjacent cutting edge of said first pair via a rounded insert corner, the adjacent cutting edges defining at said corner a substantially acute angle; said second cutting edge portion sloping towards a base of said insert so as substantially to intersect said rotary axis and so as to merge with an adjacent cutting edge of said first pair via a coupling portion which slopes away from said insert base, wherein said first cutting edge portion is formed with a reinforcing land portion and is associated for at least part of its length with a negative rake angle,and wherein said second cutting edge portion is associated over the major portion of its length with a positive rake angle.

* * * * *